Aug. 9, 1927.

E. ROUČKA 1,638,101

SYSTEM OF MEASURING BY AUXILIARY ENERGY

Filed July 17, 1922   3 Sheets-Sheet 1

INVENTOR:
Erich Roučka,
BY
Everett & Rook,
ATTORNEYS.

Aug. 9, 1927.

E. ROUČKA 1,638,101

SYSTEM OF MEASURING BY AUXILIARY ENERGY

Filed July 17, 1922

INVENTOR:
Erich Roučka,
BY
Everett + Rook,
ATTORNEYS.

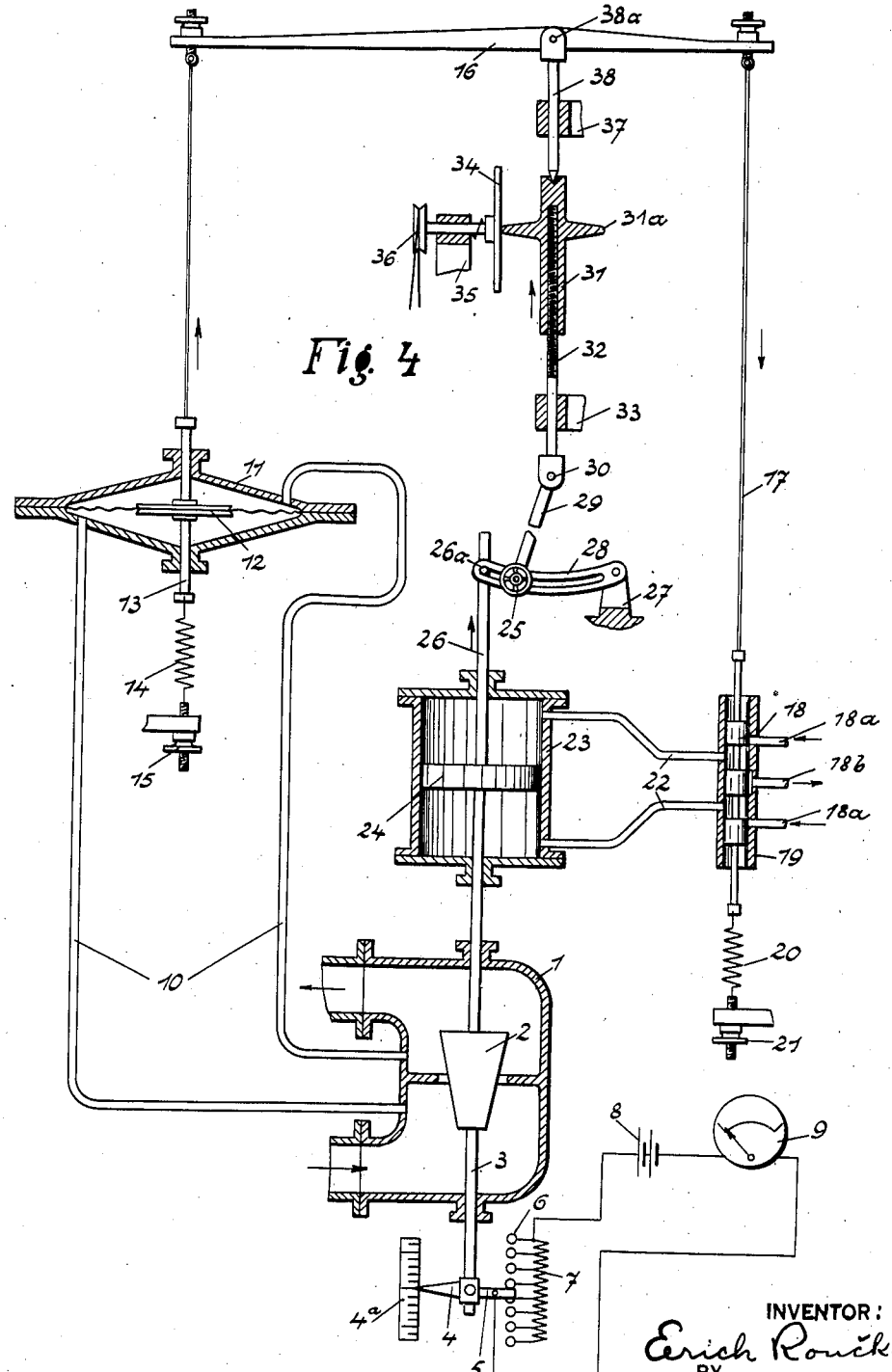

Patented Aug. 9, 1927.

1,638,101

UNITED STATES PATENT OFFICE.

ERICH ROUČKA, OF BLANSKO, CZECHOSLOVAKIA.

SYSTEM OF MEASURING BY AUXILIARY ENERGY.

Application filed July 17, 1922, Serial No. 575,748, and in Czechoslovakia August 16, 1921.

This invention relates in general to systems for measuring any physical or chemical quantities, qualities or values, such for instance, as pressure, force, position of a movable member, speed, intensity of flow, effect, momentum, temperature, heat contained in gases or fluids, efficiency, electrical and magnetic quantities, intensity of combustion, oxidation, reduction, composition of fluids, etc., by means of auxiliary energy. The measuring value may be the position, motion, speed of movement, or revolutions of a movable part; a mechanical force, a fluid condition, such as pressure, difference of pressure, or speed of flow of flowing fluid; or an electrical condition, such as current, voltage, frequency, wattage, etc.

The primary object of the invention is to provide in such a system means for preventing overthrowing or hunting in the system to ensure accuracy of measurement.

Another object is to provide novel and improved means for preventing overthrowing or hunting in a system of the character described.

The system comprises in general means sensitive to or actuated by the physical or chemical quantity, quality or value to be measured, means operated by auxiliary energy to balance said sensitive means, means for varying the auxiliary energy in accordance with variations in the said value to restore said balance, means responsive to departures from balance in the system for controlling said means for varying the auxiliary energy, and means operating upon the varying of said auxiliary energy to prevent overthrowing in the system.

Referring to the accompanying drawings, in which like numerals of reference indicate the same parts throughout the several views, Figure 1 is a diagrammatic illustration of a system embodying my invention, showing one form of means for preventing overthrowing in the system.

Figure 4 is a diagrammatic illustration of another system showing another form of means for preventing overthrowing in the system.

Figure 1:
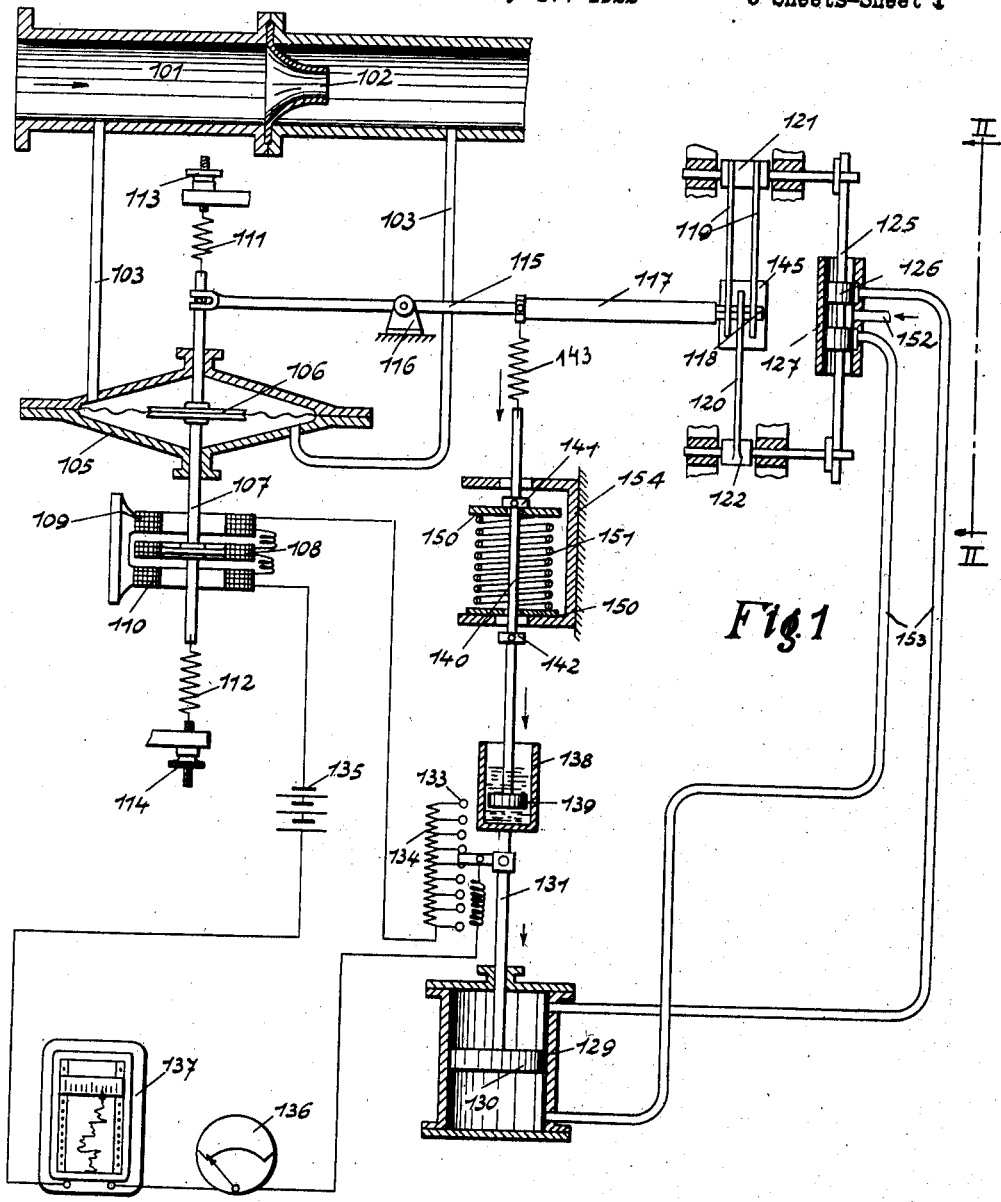

For the purpose of illustrating the principles of my invention, I have shown in Figure 1 of the drawings a system similar to that described and claimed in my copending application Serial No. 575,756, filed July 17, 1922, in which the said physical or chemical quantity or value to be measured is a fluid under pressure which may be caused to flow through a conduit or pipe 101 having a flow resistance device or orifice containing member 102 arranged therein. Pipes 103 are arranged to communicate at one end with said conduit 1 at opposite sides of member 2, said pipes communicating at their other ends with a diaphragm chamber 105 at opposite sides of a diaphragm 106, whereby the diaphragm is responsive to differences in pressure or variations in the flow of fluid at opposite sides of the member 102. The diaphragm carries a rod 107 having on one end the movable coil 108 of an electro-dynamic device of known type which also includes two fixed electro-magnetic coils 109 and 110 arranged on opposite sides of the coil 108, the said coil 108 and said diaphragm being balanced between springs 111 and 112 carried by adjusting screws 113 and 114 in fixed supports. The said electro-dynamic device is an example of means sensitive to variations in the auxiliary energy which in the present instance is electric current flowing from a suitable source of electricity, such as the battery 135. The coils 108, 109 and 110 are connected in series with the electric battery 135, and the coils 109 and 110 are wound in opposite directions so that the coil 108 is attracted by one and repelled by the other of said coils 109 and 110.

A lever 115 is pivoted intermediate its ends as at 116 to a fixed support, and one end thereof has a pin and slot connection with the rod 107, the other end being provided with a flexible or resilient member 117, such as a metal strip, provided at its free end with a wedge-shaped member 118. This lever 115 is responsive to departures from balance in the system, and is oscillated by movement of the coil 108 of the electro-dynamic device. In other words, when the forces acting on the diaphragm 106 and the forces acting on the coil 108 do not balance each other, the coil 108 is moved in one direction or the other and correspondingly swings the lever 115.

Figure 2:
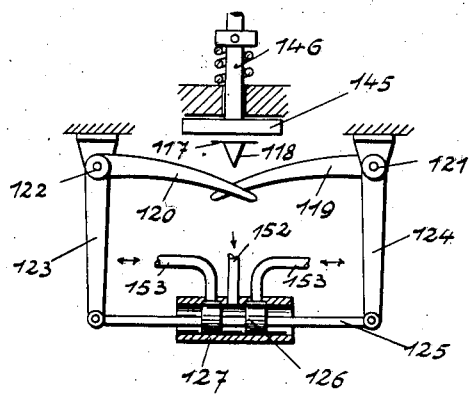
Figure 2 is an end view partially in section, viewing the same from line II—II on Figure 1.

The member 118 cooperates with levers 119 and 120 mounted at one end on shafts 121 and 122 and overlapping at their other ends, as clearly shown in Figure 2, so as to actuate a valve device comprising a cylinder 127 and a double piston valve 126 having a piston rod 125 to opposite ends of which are connected the levers 119 and 120 by links 123 and 124. This valve device controls the flow of a fluid from an inlet 152 through outlet pipes 153 to a fluid motor comprising a cylinder 129 and piston 130 having a piston rod 131. The member 118 is periodically actuated into engagement with the levers 119 and 120 to actuate the same by a suitable device actuated by auxiliary power. As an example, such a device may comprise a block 145 carried by a rod 146 slidable in a fixed support and reciprocated by a suitable source of power.

The piston rod 131 is provided with an arm 132 carrying a contact to engage the contact points 133 of a variable resistance 134 which is connected in circuit with the battery 135 and the electro-dynamic device for varying the auxiliary energy or current in the circuit. Said piston rod 131 also carries a dash-pot 138 containing a liquid and in which is loosely slidably mounted a piston 139 connected by its rod 140 and a light spring 143 to the lever 115 at the side of the pivot 116 opposite the rod 107. A spring 151 surrounds the rod 140 and is interposed between washer plates 150 slidable on the rod and limited in movement by collars 141 and 142, said spring and plates cooperating with a fixed support 154 through which moves the rod 140.

In the operation of the system, when the physical or chemical quantity, quality or value, e. g., the difference in pressure of the fluid in conduit 101 on both sides of the member 102, and the force in the electro-dynamic device are balanced, the valve piston 126 is in its neutral position and prevents flow of fluid through the pipes 153, and the lever 115 so positions the member 118 with relation to the levers 119 and 120 that member 118 engages said levers 119 and 120 equidistantly from their free ends so that both act on valve piston 126 at the same time in opposite directions. Thus, the valve 126 is not moved from its neutral position and the system remains balanced. When the balance is disturbed, as by a difference in pressure of the fluid at opposite sides of the member 102 in conduit 101, the diaphragm 106 and coil 108 of the electro-dynamic device move in one direction or the other which causes movement of the member 118 in the opposite direction. The block 145 then forces the member 118 against one of the levers 119 or 120 in advance of the other, which moves the valve piston 126 to admit fluid to one side of the piston 130 of the fluid motor 129 and from the other side thereof. This piston 130 is thus moved, and, in turn, moves the contact arm 132 over the contacts 133 of the resistance 134 to vary the auxiliary energy, e. g., the current in the circuit. This variation is a function of the value, and an electric measuring and indicating instrument 136 and a recording instrument 137 may be connected in the circuit to indicate and record the departure from balance or variation in the said quantity or quality. The variation in the auxiliary energy, in other words, the current from the source 135, actuates the electro-dynamic device to restore balance in the system.

It will be noted that the piston rod 131 moves in a direction opposite that of the member 118 on each controlling movement, and the said piston rod 131 carries the dash-pot 138 with it and through the liquid in the dash-pot yieldingly influences the rod 140 in the same direction against the action of the spring 151. The rod 140 in turn, through the spring 143, exerts a pull on the lever 115 tending to return the member 118 to its neutral position. In this operation, the liquid in the cylinder 138 slowly flows around the piston 139 from one side to the other, according to the direction of relative movement of the piston 139 and cylinder 138, so that the liquid yieldingly retards relative movement of the piston and cylinder. The member 118 is thus returned slightly before balance is restored in the system. Without the yielding return including the dash-pot 139, rod 140, and spring 143, the member 118 would return to its neutral position after the system had reached a balanced condition and would overthrow and tend to actuate the valve 126 to cause operation of the system in the opposite direction. The spring 151 serves to balance the rod 140 and return the same to its neutral or normal position after balance is restored in the system.

Figure 3:
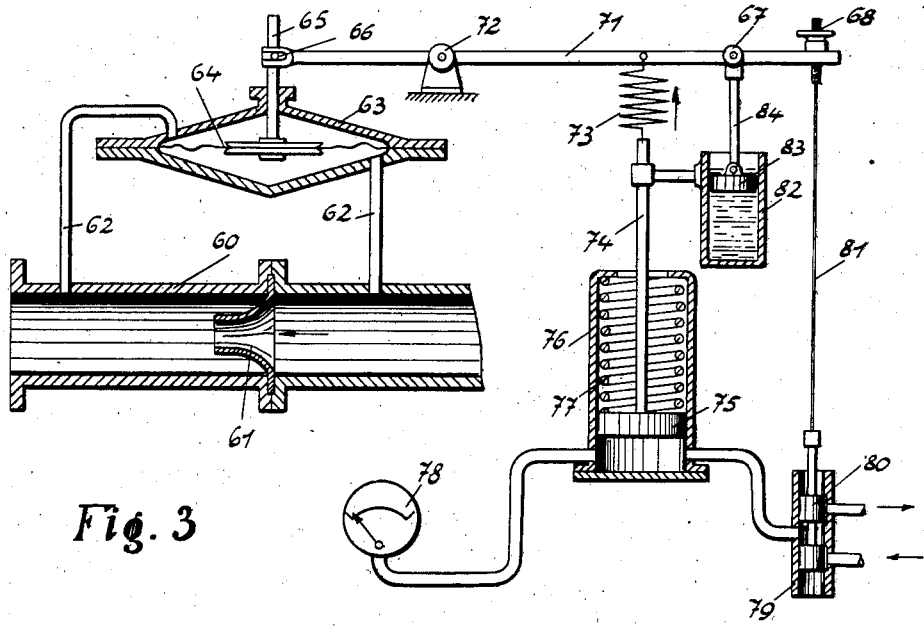
Figure 3 is a diagrammatic illustration of a modified system showing another form of means for preventing overthrowing in the system.

In Figure 3 of the drawings, the valve to be measured is also a fluid which flows through the conduit 60 having the flow resistance element 61 therein. The diaphragm chamber 63 is connected by pipes 62 to the conduit 60 in a manner similar to the connection of the diaphragm chamber 105 to the conduit 101 in Figure 1 so that the diaphragm 64 is actuated by differences in pressure on opposite sides of the flow resistance element 61. The rod 65 of the diaphragm 64 has a pin and slot connection 66 with one end of a lever 71 pivotally mounted intermediate its ends to a fixed support as at 72 and connected at its other end by means of a flexible connection 81 to a governor valve piston 80 mounted in a cylinder 79. The said governor valve controls the flow of auxiliary energy, in the present instance fluid pressure, to and from a device sensitive to variations in said fluid pressure comprising a cylinder 76 having a piston 75 mounted therein. The piston 75 has a rod 74 connected by a spring 73 to the lever 71 at the side of the pivot 72 opposite the diaphragm rod 65. The system is in balanced condition when the forces acting on the diaphragm 64 balance the forces acting on the piston 75 and when the system is in such balanced condition the valve piston 80 prevents the flow of fluid to or from the cylinder 76 behind the piston 75. Upon differences in pressure of fluid in the conduit 60, the diaphragm 64 is actuated in one direction to swing the lever 71. This motion of the lever is transmitted to the governor valve piston 80 so as to move the same and permit flow of fluid to or from the cylinder 76. If fluid is admitted to the cylinder the piston is moved against the action of a spring 77, while if fluid is permitted to flow from the cylinder 76 the piston is moved in the opposite direction by the spring 77. The motion of the piston is transmitted through the spring 73 to the lever 71 which tends to move the lever and restore balance in the system.

The piston rod 74 carries a dash-pot 82 having a liquid therein and in which is loosely mounted a piston 83 connected by its rod 84 to the lever 71 as at 67. During its controlling movements, the piston 75 moves in a direction opposite that of the movement of the end of the lever 71 connected to the governor valve 80, and the dash-pot 82 moving with the piston exerts a pull, through the liquid in the dash pot and the piston 83, and rod 84, on the lever 71 to prevent overthrowing thereof. For adjusting purposes the flexible connection 81 is preferably connected to an adjusting screw 68 mounted on the lever 71. The auxiliary energy or fluid pressure in the cylinder 76 is a measure of the value being measured, and a measuring instrument 78 is preferably connected to the cylinder to measure said fluid pressure.

In Figure 4 of the drawings the fluid constituting the value to be measured flows through a conduit 1 having a flow resistance member 2 mounted on a rod 3 slidable through the conduit 1 for adjusting the member 2 relatively to a cooperating orifice in the conduit. Pipes 10 are connected at opposite sides of the orifice in the conduit 1 and to a diaphragm chamber 11 at opposite sides of a diaphragm 12. The diaphragm is provided with a rod 13 one end of which is connected to a spring 14 connected to an adjusting screw 15 in a fixed support. The other end of the rod is connected to one end of a lever 16 pivotally mounted between its ends as at 38ª on a fulcrum member 38 slidably mounted in a fixed support 37. The other end of the lever 16 is connected by a member 17 to one end of a piston 18 mounted in a cylinder 19 of a governor valve for controlling or varying the auxiliary energy. The other end of the piston valve 18 is connected by a spring 20 and an adjusting screw 21 to a fixed support.

The auxiliary energy constitutes in this instance fluid pressure which flows through pipes 22 to and from opposite sides of a piston 24 mounted in a cylinder 23 of a fluid motor which is connected to the rod 3 of the flow resistance 2 to actuate the same. The fluid flows to said fluid motor from supply pipes 18ª and from said fluid motor through an outlet pipe 18ᵇ.

The system is in balanced condition when the forces acting on opposite sides of the diaphragm 12 are balanced.

When the system is in such balanced condition, the valve piston 18 prevents the flow of fluid to or from the fluid motor 23, 24. Upon variations in pressure at opposite sides of the flow resistance member 2 in the conduit 1, the diaphragm 12 is actuated and oscillates the lever 16 so that the valve piston 18 is moved by or against the action of the spring 20 and permits flow of fluid to one side of the piston 24 of the fluid motor and from the other side thereof. The piston 24 is thus moved in one direction and moves the flow resistance member 2 to vary the flow of fluid through the conduit 1. The force of spring 20 cooperates with the force of spring 14 acting on the diaphragm 12 so as to restore balance in the system.

The piston 24 is provided with a piston rod 26, having a pin and slot connection 26ª with a slotted arcuate lever 28 pivotally mounted at one end to a fixed support 27. The arcuate lever 28 is connected by a link 29 to one end 30 of a rod 32, the opposite end of which has a threaded connection with a nut 31 provided with a flange 31ª engaging a friction wheel 34 mounted on a shaft revoluble in a fixed support 35 by a belt and pulley connection 36 to a suitable source of power. The end of the nut 31 opposite the rod 32 receives by a conical bearing the fulcrum member 38 supporting the lever 16. When the piston rod 26 is moved, it moves the lever 28, link 29, rod 32, nut 31 and fulcrum member 38 in the same direction so as to tend to return the valve piston 18 to its neutral position. The friction flange 31ª of the nut 31 is thus moved diametrically of the friction wheel 34. The friction wheel then revolves the nut 31 in the direction to cause the nut to move on the rod 32 in a direction opposite to the movement of the piston rod 26. This movement of the nut 31 moves the fulcrum member 38 and lever 16 to their normal position. The friction flange 31ª of the nut 31 normally engages the friction disk 34 at its axis so that the nut is not rotated, but upon movement of the piston rod 26, the flange 31ª is moved to one side or the other of the axis of the flange disk 34 so as to be rotated thereby. The link 29 is adjustably connected to the arcuate lever 28 by suitable means such as the screw 25.

The rod 3 of the flow resistance device 2 carries a pointer 4 cooperating with a graduated scale 4ª to indicate the flow of fluid through the conduit 1.

If desired, the rod 3 may also be provided with a contact arm 5 slidably engaging the contact points 6 of a variable resistance 7 to control the current in a remote electric circuit including a source of electricity 8 and a device sensitive to the current such as indicated at 9.

All of the measuring systems per se shown on the drawings are described and claimed in several of my copending applications, the present invention being particularly directed to the provision and combination of overthrow preventing means with such systems to increase the accuracy thereof.

While I have shown the invention embodied in mechanisms of certain detail constructions it will be understood that this is mainly for illustrating the principles of the invention, and that many modifications and changes in the detail mechanism may be made without departing from the spirit or scope of the invention. Therefore, I do not wish to be understood as restricting myself except as required by the following claims when construed in the light of the prior art.

Having thus described the invention, what I claim is:

1. A measuring system of the class described for varying an auxiliary condition in accordance with variations in a value to be measured, comprising means sensitive to variations in said value, means sensitive to variations in said condition to balance the first mentioned sensitive means, means responsive to departures from balance of said two sensitive means, means controlled by said means responsive to departures from balance for varying said condition, means for measuring said condition, and means cooperating with said means for varying said condition and said means responsive to departures from balance during the operation of said means for varying said condition to prevent overthrowing or hunting of said means responsive to departures from balance.

2. A measuring system of the class described for varying an auxiliary condition in accordance with variations in a value to be measured, comprising means sensitive to variations in said value, means adapted to be actuated in accordance with variations in said condition to balance said sensitive means, means responsive to departures from balance of said sensitive means, means for varying said condition, a device for governing actuation of the last-mentioned means, means controlled by said means responsive to departures from balance for actuating said governing device, means for measuring said condition, and means cooperating with said means responsive to departures from balance and said means for varying said condition and operated only during operation of the latter to prevent hunting action of said means responsive to departures from balance.

3. A measuring system of the class described for varying an auxiliary condition in accordance with variations in a value to be measured, comprising means sensitive to variations in said value, means sensitive to variations in said condition to balance the first mentioned sensitive means, means responsive to departures from balance of said two sensitive means, means controlled by said means responsive to departures from balance for varying said condition, means for measuring said condition, and means including a plurality of relatively movable parts relative movement of which is yieldingly retarded by a fluid, said means connecting said means responsive to departures from balance and said means for varying said condition to prevent hunting action of said means responsive to departures from balance.

4. A measuring system of the class described for varying an auxiliary condition in accordance with variations in a value to be measured, comprising means sensitive to variations in said value, means sensitive to variations in said condition to balance the first-mentioned sensitive means, means responsive to departures from balance of said two sensitive means, means controlled by said means responsive to departures from balance for varying said condition, means for measuring said condition, means including a plurality of relatively movable parts one of which contains a fluid so that relative movement of said parts is yieldingly retarded by said fluid, said means connecting said means responsive to departures from balance and said means for varying said condition to prevent hunting action of said means responsive to departures from balance, and spring means for normally influencing said relatively movable parts into a predetermined relation.

5. A measuring system of the class described for varying an auxiliary condition in accordance with variations in a value to be measured, comprising means sensitive to variations in said value, means sensitive to variations in said condition to balance the first-mentioned sensitive means, means responsive to departures from balance of said two sensitive means, means for varying said condition including a part movable in directions opposite to that of said means responsive to departures from balance, a device for governing the actuation of said movable part of said means for varying said condition, means controlled by said means responsive to departures from balance for actuating said governing device, means for measuring said auxiliary condition, and means yieldably connecting said movable part of said varying means and said means responsive to departures from balance to prevent hunting action of said responsive means.

6. A measuring system of the class described for varying an auxiliary condition in accordance with variations in a value to be measured, comprising means sensitive to variations in said value and normally in balanced condition, means responsive to departures from said balanced condition, means for varying said auxiliary condition in accordance with variations in said value controlled by said means responsive to departures from balance, said responsive means and said varying means being movable relatively and together, a cylinder containing a liquid and having a piston loosely mounted therein, one of said cylinder and piston being connected to said varying means and the other to said responsive means to prevent hunting action of said responsive means.

7. A measuring system of the class described for varying an auxiliary condition in accordance with variations in a value to be measured, comprising means sensitive to variations in said value, means adapted to be actuated in accordance with variations in said condition to balance said sensitive means, means responsive to departures from balance of said sensitive means, means for varying said condition, a motor for actuating said varying means having a part movable in directions opposite to that of said responsive means, a governor for said motor controlled by said means responsive to departures from balance, and means cooperating with said movable part of said motor and said means responsive to departures from balance operable only during operation of said motor to prevent hunting action of said means responsive to departures from balance.

8. A measuring system of the class described for varying an auxiliary condition in accordance with variations in a value to be measured, comprising means sensitive to variations in said value, means adapted to be actuated in accordance with variations in said condition to balance said sensitive means, means responsive to departures from balance of said sensitive means, means for varying said condition, a fluid motor including a cylinder and piston for actuating said varying means, one of said cylinder and piston being movable in directions opposite to that of said responsive means, a governor for said motor controlled by said means responsive to departures from balance, and yielding means connecting said movable cylinder or piston and said means responsive to departures from balance to prevent hunting action of said means responsive to departures from balance.

ERICH ROUČKA.